United States Patent [19]

Okada et al.

[11] 3,819,484

[45] June 25, 1974

[54] PROCESS FOR PREPARING SUCROSE-STARCH SWEETNER FREE FROM REDUCING SUGAR

[75] Inventors: Shigetaka Okada, Nara; Naoto Tsuyama, Okayama; Masakazu Mitsuhashi, Okayama; Junsuke Ogasawara, Okayama, all of Japan

[73] Assignee: Ken Hayashibara, Okayama-ken, Japan

[22] Filed: Dec. 13, 1971

[21] Appl. No.: 207,578

[30] Foreign Application Priority Data
Dec. 16, 1970 Japan.............................. 45-111840
Dec. 23, 1970 Japan.............................. 45-115768

[52] U.S. Cl............ 195/31 R, 260/209 R, 426/159, 426/185, 426/213, 426/214
[51] Int. Cl............................................. C12b 1/00
[58] Field of Search............ 99/141; 195/31 R, 31 P

[56] References Cited
UNITED STATES PATENTS
3,701,714  10/1972  Okada et al...................... 195/31 R
3,703,440  11/1972  Okada et al...................... 195/31 R
3,728,132  4/1973  Tsuyama et al.................. 195/31 R Primary Examiner—Joseph M. Golian
Attorney, Agent, or Firm—Hans Berman

[57] ABSTRACT

A sweetner having some of the properties of dextrin while being practially free of reducing sugars is prepared by subjecting sucrose and dextrin to cyclodextrin-glycosyl-transferase in an aqueous medium. Depending on the ratio of sucrose and dextrin, the product obtained after destroying the enzyme and purifying the fermentation mixture may be as sweet as an equal weight of the sucrose used or primarily show the properties of dextrin solution. It is useful in preparing food in which either or both properties are desired. The product is more stable thermally and chemically than sweetners containing reducing sugars.

10 Claims, No Drawings

PROCESS FOR PREPARING SUCROSE-STARCH SWEETNER FREE FROM REDUCING SUGAR

This invention relates to carbohydrate sweeteners practically free of reducing sugars, to their preparation, and their use.

It has been found that a mixture of dextrin, which may include cyclodextrin, and sucrose when subjected to the action of cyclodextrin-glucosyl-transferase (C.G.T.) in an aqueous medium produces predominantly an oligosaccharide (maltooligosylfructose) in which glucose moieties of the dextrin chain are bound to the glucose moiety in the sucrose, the fructose moiety being terminal.

When an aqueous mixture of starch and sucrose is subjected to the action of cyclodextrin-glucosyl-transferase from *Bacillus maceras*, cyclodextrin is formed as a by-product, and the syrup obtained is turbid. The formation of cyclodextrin can be avoided by replacing starch as a starting material by an oligosaccharide having a dextrose equivalent (D.E.) of 15 or somewhat higher and obtained by hydrolyzing the starch before exposing it to C.G.T. The syrup produced under such conditions, however, contains appreciable quantities of reducing sugars originating from the starch hydrolyzate, and the product is relatively unstable for this reason.

It has now been found that liquefied (partly hydrolyzed) starch, when subjected to C.G.T. available from Bacillus macerans and Bacillus megaterium is converted to cyclodextrin and oligosaccharides, whereupon the reaction ends. When a mixture of soluble starch and sucrose is subjected to the same enzyme, cyclodextrin is initially produced, but thereafter is consumed completely, and there is ultimately produced a syrup in which oligosaccharide radicals are attached to the glucose moiety of the sucrose, and no significant amount of reducing sugar is left.

The amount of cyclodextrin which accumulates during the initial stage of the reaction depends on the molecular weight of the starch used and on the ratio of starch and sucrose in the mixture. The formation of cyclodextrin is impeded by the use of starch having a lower molecular weight and by increasing the amount of sucrose in the mixture. Since it is necessary to employ liquefied starch which is not too severely hydrolyzed in order to avoid the presence of reducing sugars, the formation of cyclodextrin is unavoidable. The cyclodextrine, however, can be consumed completely by either extending the reaction time or by increasing the amount of enzyme employed under otherwise unchanged conditions.

The optimum reaction temperature of C.G.T. is at 50° – 60°C. At this temperature, starch hydrolyzates of extremely low D.E. are degraded and the viscosity of the product rises sharply. When using starch hydrolyzates of very low D.E., such as 5 or less, the enzymatic reaction must be carried out within a short period to prevent retrogradation of the starch hydrolyzate and contamination of the product with unreacted starch. The cyclodextrin unavoidably produced is transferred to sucrose and disappears in the final stages of the reaction so as not to cause turbidity in the syrup ultimately obtained.

Starch hydrolyzates of low D.E. which contain branched saccharides may be converted to polysaccharides having straight chains only by debranching enzymes such as pullurase which is available from Aerobacter aerogenes, or isoamylase available from Pseudomonas amylodermosa. The transformation of the sucrose to an oligosaccharide having one fructose moiety and a chain of glucose moeties attached to the fructose is enhanced by the conversion of branched polysaccharides to straight chains.

When the reaction mixture contains relatively little soluble starch, a substantial portion of the sucrose present does not react, and the ratio between sucrose bound to oligosaccharide chains and total sucrose, the transfer ratio, declines, and the taste of sucrose prevails over the sweetness of the compound of the invention.

When sucrose and starch hydrolyzate are initially present in equal amounts, 50 to 70 percent of the sucrose is subjected to the transformation, and the product shows the sweetness and pleasant flavor of the sweetener of this invention. When the amount of starch is further increased, the transfer ratio of the sucrose rises beyond 60 percent, but the molecular weight of the product increases, and the sweetness decreases to some extent because of the lack of sufficient sucrose as an acceptor for the oligosaccharide chains. Under these conditions, it is also necessary to increase the amount of enzyme used and/or to increase the reaction time in order completely to consume the cyclodextrin formed initially as a by-product. There is obtained a syrup less sweet than that obtained from equal amounts os sucrose and starch, but more viscous, of even greater thermal stability, and entirely free from reducing sugars.

The amount of solids present in the aqueous mixture during the enzymatic reaction has a bearing on the properties of the ultimate product. In a substrate whose solids consisted of equal amounts of sucrose and starch, the transfer ratio was 40 percent when the solids content of the substrate was 15 percent, and 50 – 70 percent under otherwise identical conditions when the solids content of the substrate was increased to 50 percent. Accordingly, the most advantageous concentration of starch hydrolyzate or dextrin is 20 to 30 percent.

The enzymes employed in the present invention are derived from enzyme producing strains of *B. macerans* and *B. megaterium*, such as Bacillus macerans IFO 3490 and IAM 1227, 17-A strains which resemble *Bacillus macerans*, and *Bacillus megaterium* var strain T-5 (FERMP No. 935), T-10, T-26F, etc. Enzymes produced by other strains may also be employed. ATCC numbers of T-5, T-10 and T-26F are 21737, 21738 and 21739, respectively.

The effects of enzymes produced by different strains are illustrated in Table 1. The enzyme of 17-A strains was obtained by diluting a culture broth having an activity of 350 units/ml (Tilden-Hudson) to 53 units/ml, and adding one milliliter of the diluted broth to the substrate per gram of starch. The enzyme of B. megaterium var strain T-5 was prepared by diluting the broth 1.75 times, and the culture broth of T-26F was used undiluted for the same activity. Each fermentation mixture was adjusted to the optimum pH of 5.5.

All substrates contained 50 percent solids, the sucrose/starch ratios were as indicated, and the reaction periods were 2 days (approximately 48 hours) at 55°C in each case. The Table lists the amount of reducing sugar in the product as a percentage fraction of total sugar present and the transfer ratio in percent. Under the conditions outlined above, cyclodextrin had disappeared completely. The transfer ratio was calculated by subjecting the fermentation mixture to assay by paper chromatography for fructose, and cyclodextrin was similarly isolated by paper chromatography and estimated from the color reaction with iodine.

TABLE 1

| Sucrose : Starch | 17-A Red'g Sugar | 17-A Transfer Ratio | T-26F Red'g Sugar | T-26F Transfer Ratio | T-5 Red'g Sugar | T-5 Transfer Ratio |
|---|---|---|---|---|---|---|
| 2 : 1 | 1.05 | 37.7 | 0.83 | 43.6 | 0.88 | 45.5 |
| 3 : 2 | 0.99 | 47.0 | 0.82 | 50.0 | 0.85 | 49.5 |
| 1 : 1 | 1.05 | 58.1 | 1.06 | 60.1 | 1.01 | 58.8 |
| 1 : 2 | 1.10 | 73.3 | 1.02 | 74.0 | 0.89 | 74.0 |
| 1 : 4 | 1.11 | 83.2 | 1.12 | 85.0 | 0.99 | 84.2 |
| 1 : 6 | 1.13 | 88.0 | 1.40 | 90.2 | 1.24 | 89.1 |
| 1 : 8 | 1.25 | 88.0 | 1.47 | 91.1 | 1.37 | 90.0 |

When the solids present were reduced to 25 percent consisting of equal amounts of starch and sucrose, the reducing sugar values for the three strains were 1.10, 1.06, and 1.19 percent respectively, and the transfer ratios 49.7, 54.9, and 52.7 percent. Traces of cyclodextrin could be detected in each case. At a solids concentration of 16.7 percent (1:1 sucrose:starch), the reducing sugar values were 1.28, 1.18, and 0.91 percent, and the transfer ratios 41.3, 43.7, and 45.6 percent. Significant, though small amounts of cyclodextrin were found in each of the three reaction mixtures, indicating the need for higher enzyme concentrations or longer reaction periods.

While the comparison tests described with reference to Table 1 were carried out with the culture broths of the several microorganisms, the same or closely analogous results were obtained by means of enzyme preparations obtained by salting out from the broth and further purification and concentration, as by precipitating the enzyme by means of a solvent miscible with water, as is conventional. While the potencies of the several broths differ, the differences are only quantitative and can be compensated for by varying the amounts used.

The soluble starch employed may be of any origin. Cereal starches such as corn starch or wheat starch are equivalent to tuber or root starches, such as those derived from potatoes, sweet potatoes, cassava or sago. Soluble or liquefied starches may be derived from the raw starches by acid hydrolysis or by the use of enzymes. Starch liquefied by enzymes, such as α-amylase, is preferred because it contains a smaller fraction of oligosaccharides of low molecular weight. A starch hydrolyzate having a dextrose equivalent (D.E.) of 10 or less is preferred, and a D.E. of 0.5 to 5 is most desirable to prevent reducing properties.

An initial mixture of sucrose and starch 1:1 produces a syrup which is intensely sweet. When higher viscosity and high thermal stability are more important than sweetness, as much as 10 parts of starch may be combined with one part of sucrose, all parts being by weight, unless otherwise stated explicityly. With a high starch:sucrose ratio, it is necessary to use more enzyme or to increase the reaction period for complete decomposition of cyclodextrin. It is most advantageous to maintain an initial solids concentration of about 50 percent.

The reaction temperature and pH are chosen according to the specific enzyme employed. A pH range of 4.5 to 8.0, and a temperature of 45° to 60°C are best for enzymes derived from strains of 17-A or T-5.

The reaction period depends on the enzyme activity. It is preferred to select the enzyme concentration so that the reaction is completed within two days with complete disappearance of insoluble cyclodextrin.

The solution obtained by the enzyme action is heated to inactivate the enzyme, and is thereafter purified in a conventional manner before it is used in food. The use of active carbon followed by removal of cations by ion exchange is typical of the purification methods employed. A colorless, transparent, and odorless starch syrup is obtained and may be partly evaporated to increase its viscosity, or spray-dried to produce a water-soluble powder.

The composition of the product varies depending on the ratio of starch hydrolyzate and sucrose in the substrate. It consists chiefly of maltooligosyl fructose and of small amounts of sucrose and oligosaccharides. Table 2 lists the products obtained under otherwise the same conditions when the sucrose:starch ratio varied from 2:1 to 1:4. The reducing sugars and transfer ratios are expressed in percent as in Table 1. (GFS) indicates the combined percentage of glucose, fructose, and sucrose. (A) are transferred saccharides having a degree of polymerization (D.P.) of less than 9, (B) are transferred saccharides of D.P.9 or higher, and (O) are oligosaccharides, all in weight percent. Sweetness was gradually reduced from very sweet at a sucrose:starch ratio of 2:1 to very little sweetness in the very viscous syrup obtained at a ratio of 1:4.

| Sucrose : Starch | Red'g Sugar | Transfer Ratio | (GFS) | (A) | (B) | (O) |
|---|---|---|---|---|---|---|
| 2 : 1 | 0.85 | 43.5 | 38.0 | 50.7 | 5.3 | 6.0 |
| 1 : 1 | 1.01 | 58.3 | 21.0 | 63.5 | 4.5 | 11.0 |
| 1 : 2 | 1.03 | 72.0 | 9.0 | 70.2 | 3.3 | 17.5 |
| 1 : 4 | 1.15 | 85.0 | 2.1 | 75.0 | 3.0 | 20.5 |

The transfer ratio is favorably affected if amylopectin-1,6-glucosidase is added to the starch prior to the saccharification reaction.

The sucrose-starch syrups primarily produced by the reaction of the invention, and the dry powders obtained from the syrups contain, as their main constituent parts, new oligosaccharides in which the ratio of glucose to fructose may vary from 1:1 to 9:1 and even higher, and which do not show significant reducing properties. Their sweetness may be as strong as that of an equal weight of sucrose, but it has a somewhat different character considered more pleasant by most people. Because of the absence of significant amounts of reducing sugars, the compounds of the invention are thermally stable, and stable in the presence of nitrogen compounds which react with reducing sugars to form colored Maillard reaction products. They do not undergo Strecker's reaction. Although they are free of dextrin of high molecular weight, they may form viscous solutions desirable in many food products, and have unusually high thermal stability when prepared from a mixture rich in starch.

When a sucrose solution, a syrup of this invention prepared from equal weights of starch and sucrose, a glucose solution, and a starch solution of D.E. 40 were subjected under comparable conditions to the Maillard reaction with polypeptone for 10, 30, 50 minutes, and the absorption of the reaction products was measured at 480 m$\mu$, the following results were obtained:

TABLE 3

|  | Sucrose | Syrup | D.E.40 | Glucose |
|---|---|---|---|---|
| 10 min. | 0.0 | 0.018 | 0.205 | 1.08 |
| 30 do. | 0.03 | 0.088 | 0.88 | >2 |
| 50 do. | 0.08 | 0.265 | >2 | >2 |

When the four solutions listed in Table 3 were subjected to temperatures of 100°, 120°, and 130°C for 30 minutes, and the absorption values were measured at 480 mu as above, the following results were obtained:

TABLE 4

|  | Sucrose | Syrup | D.E.40 | Glucose |
|---|---|---|---|---|
| 100°C | 0.0 | 0.0 | 0.0 | 0.0 |
| 120°C | 0.03 | 0.088 | 0.88 | >2 |
| 130°C | 0.375 | 0.700 | >2 | >2 |

The products of the invention prepared from mixtures high in sucrose have a low degree of polymerization and high sweetness. Still, for equal sweetness, the solutions are more viscous than those of sucrose. If the ratio of sugar to starch decreases, the sweetness is reduced, and the viscosity is further increased, and both properties are valuable in foods of many kinds including candies, chocolates, caramel, biscuits (cookies), confectionaries, bread, sponge cake and other bakery products, condensed, evaporated, and powdered milk, instant foods of many kinds, soft drinks, carbonated or not, instant coffee, fruit juice, lactic acid drinks such as buttermilk and yoghurt, ice cream, sherbet, frozen desserts, instant soups, and all kinds of canned food.

The types of syrups of the invention are readily selected for a specific application according to sweetness and viscosity data. Syrups of 70 percent solids content were prepared according to the invention from 1:1 mixtures of sucrose and starch and from high maltose starch. At 22°, 40°, and 60°C, the syrup of the invention had viscosities of 1380, 386, and 153 cp respectively, whereas the high maltose starch syrup had corresponding viscosities of 1000, 233, and 131 cp.

Candy prepared by evaporating the afore-mentioned syrup to dryness at 140°C was less hygroscopic than candy prepared in the same manner from the high maltose starch syrup referred to above or from starch syrup having a D.E. of 43. The several batches of candy were stored at 30°C and 80 percent relative humidity for an equal time, and the increase of the surface covered by each candy was calculated after a uniform test period.

The increase in surface area for the candy of this invention was but a fraction of the corresponding area increase for the other types. Because of their low hygroscopicity at relatively high D.P., the oligosaccharides of the invention are effective dispersing and stabilizing agents for foods, and prevent crystallization in food having a high content of crystallizable glucose or sucrose, as in hard candy. For reasons not yet fully established, they improve the texture and shelf life of bakery products and the flavor of fruit drinks. They stazilize the protein in lactic acid drinks, such as buttermilk.

The following Examples further illustrate this invention.

EXAMPLE 1

20 Parts soluble starch and 20 parts powdered sucrose were dissolved in 60 parts water, and the solution was adjusted to pH 5.5 at 60°C. The enzyme salted out from a culture of 17-A strains was added to the hot solution in an amount of 53 Tilden-Hudson units per gram of starch, and the mixture was incubated for 2 days, whereupon the cyclodextrin initially present in the solution had disappeared completely, as indicated by a negative iodine reaction.

The broth was decolorized with activated carbon, and then purified by passage over ion exchange resin at low temperature. The purified liquid so obtained was partly evaporated to a syrup which was colorless, transparent, and odorless, and had an intensive sweetness characteristically different from that of sucrose syrup. The transfer ratio was found to exceed 60 percent.

When the syrup was further evaporated by direct heating to drive off practically all water present, there were obtained colorless hard candies which were fully transparent, of low hygroscopicity, and a pleasant strong sweetness.

EXAMPLE 2

A 35 percent starch slurry prepared from purified potato starch was mixed with 0.2 percent amylopectin-$\alpha$-1,6-glucosidase, and the mixture was held at pH 6.0 and 90°C until the dextrose equivalent (D.E.) of the hydrolyzate was 5. The liquified starch was then diluted with warm water to a solids content of 20 percent, and powdered sucrose was added in an amount of 150 percent of the starch. After the pH was adjusted to 5.5 and the temperature to 57°C, 25 units purified C.G.T. from T-5 were added per gram of starch present, and the broth was incubated for 2 days, whereafter the enzyme was inactivated by heating. After purification as in Example 1, a colorless solution was obtained. It was extremely sweet and was not affected by prolonged heating. The transfer ratio was 58 percent.

EXAMPLE 3

A slurry of 35 percent corn starch in water was adjusted to pH 6.0, and 0.2 percent amylopectin-$\alpha$-1,6-glucosidase (based on the solid starch) was added. The starch was liquefied to D.E. 3 by brief heating to 90° to 95°C with stirring. One part sucrose per seven parts starch was added to bring the solids content to 40 percent, and the solution was adjusted to pH 5.5 and 60°C. 55 Units C.G.T. per gram of solids were added in the form of a culture broth of 17-A strains, and the mixture was incubated for 3 days, after which the cyclodextrin had disappeared. The enzyme was deactivated by heating, and the broth was purified as described in Example 1, and partly evaporated. The syrup so obtained showed a transfer ratio exceeding 90 percent. It was not as sweet as the products obtained in Examples 1 and 2, and of higher viscosity. It was even more stable at elevated temperatures, and the solid obtained from the syrup by complete drying had little hygroscopicity.

EXAMPLE 4

A 35 percent suspension of potato starch in water was mixed with 0.2 percent of the afore described enzyme based on the weight of the starch, and the mixture was held at pH 6.0 and 90° to 93°C to liquefaction of the starch to a D.E. of 10. The mixture was then cooled, sucrose was added to make the total solids 50 percent, and the pH and temperature were adjusted to 5.5 and 55°C respectively. Enzyme salted out of a broth of T-26 strains was added in an amount of 55 units per gram of starch, and the fermentation was carried out by incubation for two days.

The broth was worked up as in the preceding examples and yielded an intensely sweet, colorless, and transparent syrup containing about 4 percent reducing sugar, based on the total sugar present. Still, the sweetness, reducing properties, and thermal stability were superior to the corresponding properties of a syrup produced by hydrolysis of starch. The transfer ratio was 45 percent.

EXAMPLE 5

A 30 percent slurry of purified corn starch in water was gelatinized by heating at 170°C and pH 5.0 to D.E. 2. An amount of sucrose equal to the amount of the starch was added to raise the solids content to about 40 percent, and the mixture was adjusted to pH 5.5 and 55°C. 50 Units of C.G.T. derived from 17-A were added for each gram of starch, and the broth was incubated for 2.5 days, whereupon it was worked up to a purified syrup as in the preceding examples, evaporated to a concentration of 60 percent, and sprayed from a nozzle into an air stream of 150°C. The powder obtained by such spray-drying still contained 3 percent moisture, had a pleasant sweetness and flavor and was practically free of reducing sugars.

In a modification of this procedure, the gelatinized starch solution was cooled from 170°C to 55°C and adjusted to pH 5.5, whereupon 20 units pulluranase were added for each gram of starch to decompose the branched chains of amylopectin in the starch to the linear chains. Thereafter, the C.G.T. enzyme and sucrose were added as above. The viscosity of the reaction mixture was lower than without the pulluranase treatment, and the transfer ratio was increased.

Example 6. Preparation of Sweetened Condensed Milk

Cow's milk was heated and sterilized in a pan at 80°C, after adjusting its fat content, and concentrated at a temperature as low as possible, carefully avoiding degeneration of the milk. Almost at the completion of concentration, the sweetener of the invention was added in an amount of 18 percent of the condensed milk. Concentrating was stopped when the water content of the milk became 25.5 – 26.5 percent. The obtained condensed milk had a desirable viscosity. It was cooled below 15°C. and crystals of lactose were dispersed finely due to the sweetener's ability to prevent crystallization, whereby the condensed milk had a very smooth taste. The milk was canned according to the usual method. Coloring or color changing was not observed during concentration and preservation, because of the presence of said sweetener.

Example 7. Preparation of Hard Candies

Usually, candy drops of high quality are prepared by adding a small amount of common starch syrup to sugar. Since the sweetener of the invention has a sweetness more desirable than that of sugar and a viscosity similar to that of common starch syrup, and is non-crystallizable, it is possible to produce candy drops using the present sweetener alone. The production is as follows:

The sweetener was concentrated in vacuo to about 130°C, and mixed with an organic acid, a flavoring agent and a coloring agent on a cooling plate. When the sweetener was cooled to 80°C, it was formed into drops using a forming or a sizing roll and cooled. The candy drops so obtained were transparent and crisp, having desirable sweetness, and left refreshing taste in the mouth.

Example 8. Preparation of Sponge Cakes.

By replacing 50 – 100 percent of the sugar used for producing sponge cakes with the sweetener of the invention, sponge cakes having characteristic sweetness and flavor, desirable humidity, and good storage life can be obtained. The process is as follows.

The sweetener containing 30 percent of water was added to egg yolk, to which small amounts of shortening oil and brandy were also added and mixed thoroughly. The egg white was beaten, added to the above mixture and beaten again. To the mixture was added sieved wheat flour and mixed quickly to dough. The dough was poured into molds lined with paper, and baked in an oven at 300°C for 40 minutes. The baked cakes were treated with butter cream after removal of the papers. The obtained cakes had a fine texture and desirable humidity, and they could be preserved 1.5 – 2 times as long as cakes made with sugar.

What is claimed is:

1. A method of producing a sucrose starch product which comprises:
    a. subjecting a mixture of sucrose and of dextrin having a dextrose equivalent value not greater than 10 in an aqueous medium to the action of cyclodextrin-glycosyl-transferase until glucose and oligosaccharides produced by said action from said dextrin are bound to molecules of said sucrose, and said mixture is free from cyclodextrin and free from significant amounts of reducing sugar; and
    b. purifying the aqueous mixture so obtained.

2. A method as set forth in claim 1, wherein said purified aqueous mixture is evaporated to dryness.

3. A method as set forth in claim 1, wherein said dextrin is obtained prior to said subjecting thereof to said action by holding starch or cyclodextrin under conditions of hydrolysis.

4. A method as set forth in claim 3, wherein said conditions of hydrolysis include contact with amylopectin-α-1,6-glucosidase.

5. A method as set forth in claim 1, wherein the amount of said cyclodextrin-glycosyl-transferase is 25 to 63 Tilden-Hudson units per gram of said dextrin.

6. A method as set forth in claim 5, wherein the temperature of said medium is 50° to 60°C, and said dextrose equivalent value is not greater than 5.

7. A method as set forth in claim 6, wherein the pH of said medium is 5.5.

8. A method as set forth in claim 5, wherein said dextrose equivalent value is 0.5 to 5.

9. A method as set forth in claim 1, wherein the amount of said cyclodextrin-glycosyl-transferase is sufficient to cause complete disappearance of insoluble cyclodextrin within 2 days.

10. A method as set forth in claim 1, wherein said cyclodextrin-glucosyl-transferase is produced, prior to said subjecting, by *Bacillus macerans* or *Bacillus megaterium*.

* * * * *